United States Patent
Moll et al.

[15] 3,638,751
[45] Feb. 1, 1972

[54] APPARATUS FOR AUTOMATICALLY STEERING POWERED VEHICLES

[72] Inventors: Hans H. Moll; Werner Hundt, both of Munich, Germany

[73] Assignee: Maschinenfabrik Augsburg-Nurnberg Aktiengesellshcaft, Munich, Germany

[22] Filed: Apr. 21, 1969

[21] Appl. No.: 817,715

[52] U.S. Cl..............................................180/98, 318/587
[51] Int. Cl..............................................B62d 1/24
[58] Field of Search..............180/98, 79, 79.1; 318/16, 587; 250/106 V, 202; 246/29, 30; 172/2, 3

[56] References Cited

UNITED STATES PATENTS

| | | | |
|---|---|---|---|
| 3,513,931 | 5/1970 | Warner et al. | 180/98 |
| 2,699,834 | 1/1955 | O'Brien | 250/106 V X |
| 2,842,039 | 7/1958 | Swingle | 180/79.1 X |
| 2,999,938 | 9/1961 | Hann et al. | 250/202 |
| 3,152,317 | 10/1964 | Mayer | 180/98 |
| 3,169,598 | 2/1965 | Finn-Keicey et al. | 180/79 |
| 3,294,178 | 12/1966 | Lawson et al. | 172/3 |
| 3,337,866 | 8/1967 | Gisonno | 246/29 UX |

*Primary Examiner*—Kenneth H. Betts
*Attorney*—Francis D. Stephens and Hugo Huettig, Jr.

[57] ABSTRACT

Vehicles steered by signals received from a line placed along a roadway have impulse-receiving means sensitive across the width of the vehicle to signals received from said line.

4 Claims, 5 Drawing Figures

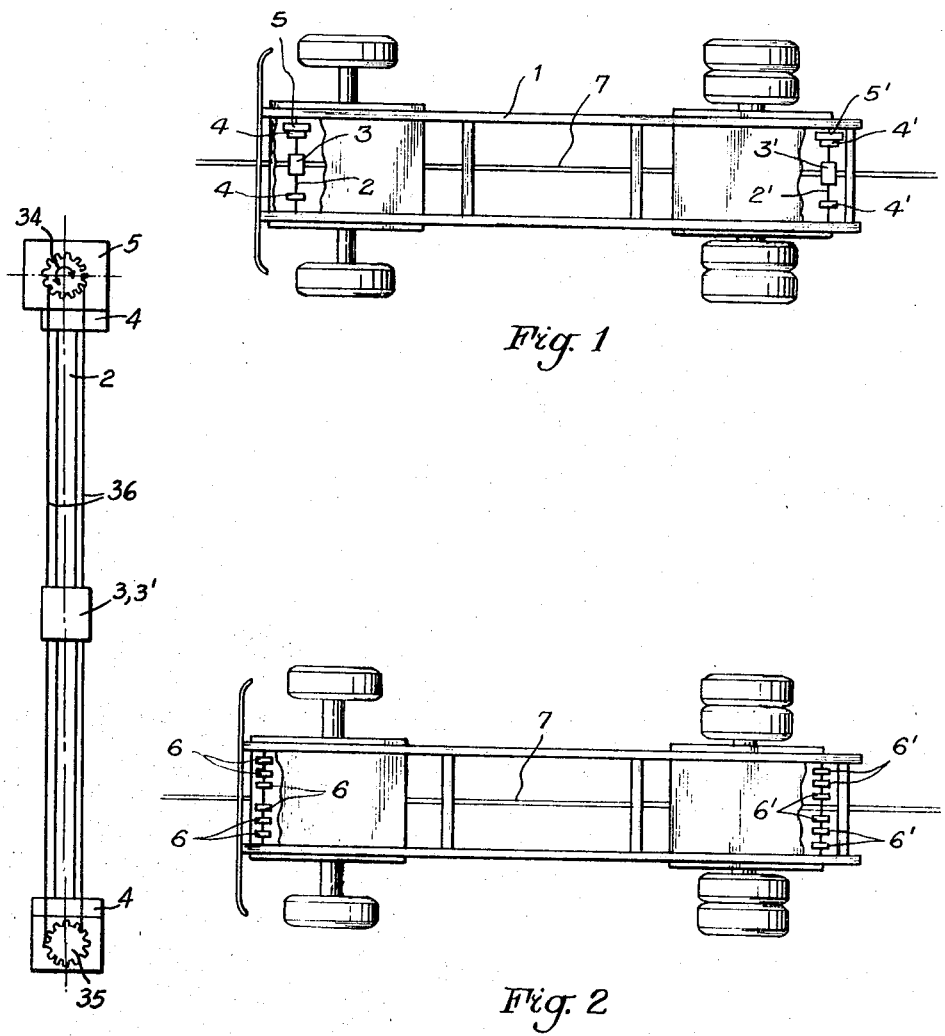

PATENTED FEB 1 1972

INVENTORS
Hans H. Moll
Werner Hundt

APPARATUS FOR AUTOMATICALLY STEERING POWERED VEHICLES

This invention relates to an apparatus for automatically steering a vehicle along an impulse-emitting line laid along a roadway, the impulses being received by a receiver mounted in the vehicle and from which the steering of the vehicle is controlled when the vehicle deviates from the impulse-emitting line so that the vehicle is guided by the impulse line.

Heretofore, slowly moving vehicles having very little mass have been steered or guided by means of an automatic control, such as an inductive photoelectric or photomagnetic electric control. For this purpose, an emitting line, such as in the form of a rail, is laid along the driveway which, for example, can be in a factory machine room, and the automatically guided vehicle has a receiver, such as a photocell. This receiver is rigidly mounted in the vehicle. When the vehicle deviates from the predetermined travel direction, which means that the receiver is deviating from its guideline, then the receiver reacts to produce a controlling impulse on the vehicle steering gear to bring the vehicle back to the direction of travel determined by the sender.

The use of such an automatic control in trucks moving at a higher velocity and having a much more substantial or larger mass is not passible because a heavy truck having a rigidly mounted receiver could, because of its high inertia, easily deviate from the guideline such a distance that the receiver loses contact with the guideline before the steering signals would be effective.

The object of this invention is to produce an apparatus for the automatic guiding of powered vehicles, especially heavy trucks and trailer trucks, which will keep the trucks, despite their large mass and high speeds, on the guideline positioned along an expressway.

In general, the objects of the invention are obtained in that the vehicle is permitted to deviate from the travel direction predetermined by the impulse line over a larger extent within permissible limits for steering the vehicle over a greater range of deviation from the guideline.

In this invention, if a vehicle having a large mass and travelling at a high speed and steered from a guideline deviates from the direction of travel determined by the sending line, then this deviation can occur suddenly and to a large amount because of, for example, the surface or banking of the road or a side gust of wind, among other things. A receiver rigidly mounted in the vehicle would therefore move quickly out of the range of the emitting line and the automatic steering would become useless and most likely there would be an accident since the vehicle is no longer guided. In this invention, the receiver does not move so far to the side the vehicle is deviating and therefor remains within the effective range of the impulse-emitting line and deviates from said line only so far that the control signal can activate the steering gear so that the vehicle is again brought back to the travel direction as originally set by the emitting guideline. In a further development of this invention, this principle is easily understood in that the receiver is mounted in the vehicle so that it can be moved from side to side of the vehicle and is positioned between two final stops on a rod positioned transverse to the travel direction for the vehicle.

During a sudden sidewise deviation of the vehicle away from the guideline, the receiver which is movable from side to side of the vehicle remains closer to the guideline even though it moves sidewise with regard thereto and thus can maintain a controlling effect on the vehicle-steering gear. Because the receiver can slide transversely with respect to the vehicle, it is not pushed suddenly out of the effective range of the guideline, i.e., without being able to exert a controlling effect on the steering gear. Thus the receiver remains within the effective area of the sender a much longer time than a rigidly mounted receiver and therefore can return a vehicle which has suddenly deviated a large amount from a predetermined travel direction back into the proper direction.

A further advantage of this invention is in that the movability of the receiver from side to side of the vehicle results in a limited free wheel effect. This means that unavoidable slight deviations of the vehicle from the guideline will not necessarily activate the steering gear in response to a guiding impulse from the guideline. Thus the vehicle can move forward in the travel direction while moving slightly from side to side in a normal manner without running the risk that the receiver reacts from the guideline. Only during an extensive deviation of the vehicle from the travel direction is a controlling impulse sent and received which causes the steering gear to steer in the opposite direction. This factor is of great significance for rapidly moving vehicles because, in this case, slight deviations from the direction of travel are part and parcel of normal driving and such deviations can be easily corrected without having to resort to the force of the guiding impulses from the guideline. If during each slight deviation the receiver would react to actuate the steering gear, then this would not result in improved driving but would merely cause the danger of making the vehicle sway because of the quick succession of controlling steering impulses. The danger of such swaying in rapidly moving vehicles of large mass is eliminated by the relative sidewise movement between the vehicle and the receiver.

Another feature of this invention using the sidewise movable receiver is in that only the small mass of the receiver has to be "after controlled" with corresponding small time constants of the receiver so that the entire apparatus can be constructed relatively inexpensively.

In this invention, several solutions for the sidewise movable receiver can be made in a mechanical-electric or purely electrical manner. In one solution, the receiver consists of several partial receivers which are each rigidly symmetrically mounted in the vehicle adjacent one another and transversely of the longitudinal axis of the vehicle so that each partial receiver becomes effective one after the other or successively during a deviation of the vehicle from the guideline.

If during travel along a straight line a central partial receiver leaves the effective sender range, then an adjacent partial receiver becomes effective so that, despite sudden extensive deviations of the vehicle from the travel direction, it is guaranteed that the steering gear of the vehicle is activated by the receiver. In this case, the receiver can function in such manner that the transverse movement is electrically differentiated and is used as a measurement for the extent of steering gear control. The same effect can also be achieved when the transverse velocity of the receiver is differentiated and the transverse movement that is found is used as the measurement for the control of the steering gear.

Also, the receiving means of this invention can be mounted on both the front and rear end of a truck, trailer truck, or the like. In this case, dangerous swaying movements of the vehicle are prevented in that the brakes of the rear wheels are actuated in dependence on the transverse acceleration received in the receiver.

The means by which the objects of this invention are obtained are described more fully with reference to the accompanying schematic drawings in which:

FIG. 1 is a plan view of a vehicle in which the receiver is movably mounted on a rod extending transversely of the rear of the vehicle; and FIG. 2 is a similar view of a modification showing a plurality of partial receivers symmetrically mounted transversely of the vehicle adjacent one another;

Figure 3:
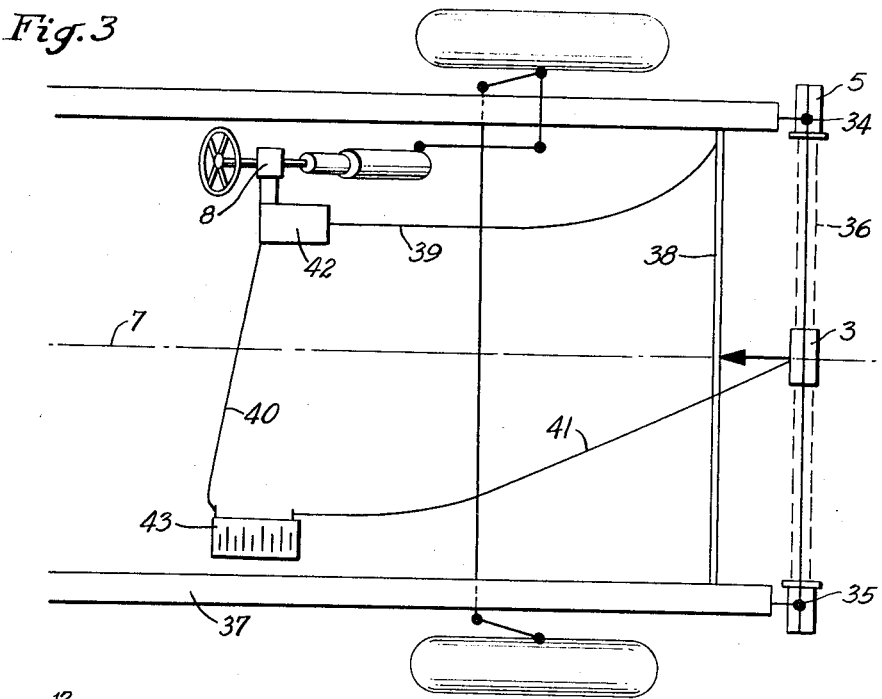
FIG. 3 is a partial plan view of the vehicle of FIG. 1 showing the steering control.

FIG. 3a of the chain drive for the receiver shown in FIGS. 1 and 3; and

Figure 4:
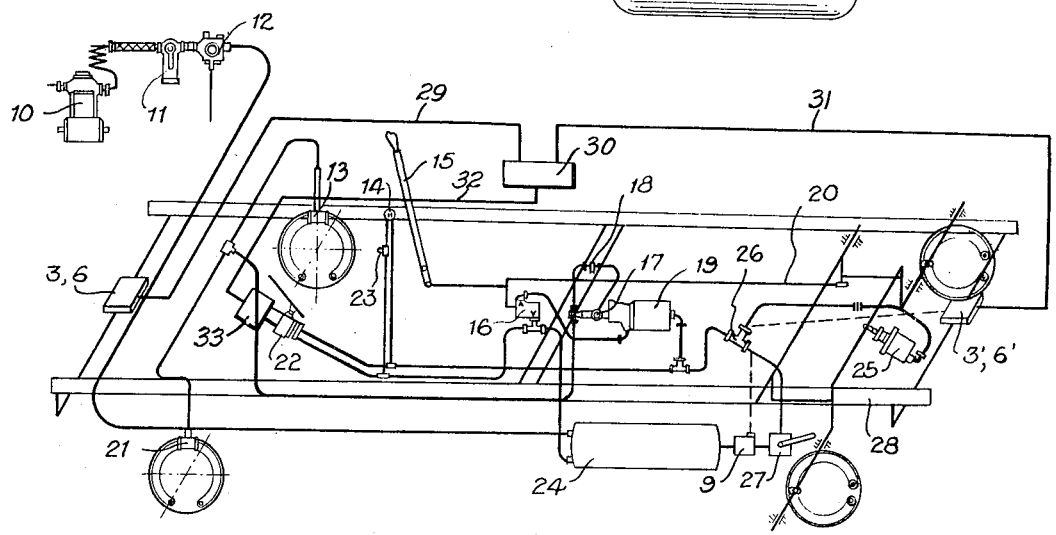

FIG. 4 is a view of the vehicle's brake system.

As shown in FIG. 1, the frame 1 of the vehicle has at both its front and rear ends, respectively, transverse rods 2 and 2' upon the centers of which are movably mounted receivers 3 and 3' which can move between limit stops 4 and 4'. The receivers are movable transversely of the longitudinal axis of the vehicle by means of control motors 5 and 5', respectively, back to their original position above the guideline on impulse sender 7.

In the modification of FIG. 2, a plurality of receivers 6 and 6' take the place of the individual receivers 3 and 3' of FIG. 1 and they are symmetrically mounted on transverse rods adjacent one another. The guideline 7 can be of any suitable form, such as a rail, a cable, a wire or the like.

As shown in FIG. 3 steering is either manually or with the aid of a motor 8 controlled and operated by impulses emitted by said receiver(s) 3,3'/6,6'.

In FIG. 3 the receiver 3 receives impulses from line 7. These impulses actuate the motor 5 so that it displaces sprocket gears 34 and 35 and sprocket chain 36 on rod 2 so that the maximum impulse force is felt.

The receiver 3 is moved transversely of the vehicle in such a way that at all times it is subject to the maximum effect of the impulses emitted from line 7. The position of receiver 3 at any given moment with regard to the longitudinal axis of the vehicle is determined by means of a variable resistance 38 in contact with receiver 3.

Receiver 3 is joined by line 41 to battery 43. Depending upon the position of receiver 3 with regard to the longitudinal axis of the vehicle, correspondingly large or small amounts of electricity flow through resistor 38 and 39 to amplifier 42, which in turn is connected by line 40 to battery 43. This in turn actuates motor 8 of the vehicle-steering system so that the vehicle frame is steered so that the receiver 3 can be set on the longitudinal axis of the vehicle by motor 5. The vehicle in this way is steered by the position of receiver 3 on rod 2. When the vehicle moves straight ahead, then receiver 3 is centered on the vehicle and the longitudinal axis of the vehicle is centered exactly above line 7. When the vehicle moves around a curve, then receiver 3 is displaced from the longitudinal axis of the vehicle by motor 5 and thus is moved to the right or left of the vehicle centerline. As stated before, receiver 3 is again centered above line 7.

In FIG. 4, the receiver 3 or 6 on the front end of the vehicle is connected by line 29 to computer 30. Receiver 3' or 6' on the rear end is connected by line 31 to computer 30. Thus, the computer receives values corresponding to the transverse movement of receivers 3 or 6 and 3' or 6'. The corresponding transverse acceleration is determined by the corresponding transverse velocity. If the transverse acceleration of the receiver 3' or 6' is larger, by a predetermined value, than that of receiver 3 or 6, then the computer 30, by way of line 32, actuates a magnetic valve 33 which in turn actuates the vehicle braking system.

As shown in FIG. 4 the rear axle part of the brake system can be operated either through the brake pedal or said receiver(s) 3,3'/6,6'. In the latter case operation is via the magnetic valve 9 controlled and actuated by the impulses emitted by said receiver(s). Braking is initiated the very moment the transverse acceleration of the vehicle exceeds the permissible limit.

As shown in the layout the brake system consists of:

| | |
|---|---|
| magnetic valve | 9 |
| air compressor | 10 |
| air filter | 11 |
| pressure regulator | 12 |
| hydraulic wheel cylinder, r.h. front | 13 |
| two-pointer gauge | 14 |
| handbrake lever | 15 |
| pneumatic brake valve | 16 |
| hydraulic master cylinder and reservoir | 17 |
| release valve | 18 |
| double-acting brake cylinder | 19 |
| handbrake rod | 20 |
| hydraulic wheel cylinder, l.h. front | 21 |
| treadle-type brake valve | 22 |
| pneumatic stoplight switch | 23 |
| air storage tank | 24 |
| pneumatic cylinder, rear brake | 25 |
| two-way valve | 26 |
| brake pressure regulator | 27 |

Reference 28 denotes vehicle frame

Having now described the means by which the objects of this invention are obtained:

We claim:

1. In an apparatus for the automatic control of a vehicle traveling on a roadway comprising impulse-emitting line means coextensive with the roadway, a vehicle on the roadway and having a longitudinal axis, and receiver means in the vehicle for steering said vehicle in response to impulses received from said line means, the improvement comprising said receiver means being automatically positionable transversely across said vehicle for receiving at any position transversely of said vehicle the strongest impulse from said line emitting means, and motor means responsive to the position of said receiver means for steering said vehicle from a weak impulse position of said receiver means to the strongest impulse position at which said longitudinal axis is centered exactly about said impulse-emitting line means.

2. In an apparatus as in claim 1, said receiver means being mounted in said vehicle for movement from side to side of said vehicle.

3. In an apparatus as in claim 2, said receiver means being mounted on a rod, and stop means on said rod for limiting the movement of said receiver means.

4. In an apparatus as in claim 1, said receivers being mounted on both the front and rear of a truck, trailer truck or the like having the rear wheel brakes actuable in dependence on the transverse acceleration by said receiver means.

* * * * *